United States Patent [19]

Opravil

[11] 4,204,735
[45] May 27, 1980

[54] EXPOSURE CARRIAGE FOR A COPYING MACHINE

[75] Inventor: Egon Opravil, Brackel, Fed. Rep. of Germany

[73] Assignee: Lumoprint Zindler KG (GmbH & Co.), Hamburg, Fed. Rep. of Germany

[21] Appl. No.: 19,624

[22] Filed: Mar. 12, 1979

[30] Foreign Application Priority Data

Apr. 19, 1978 [DE] Fed. Rep. of Germany ....... 2817013

[51] Int. Cl.² .............................................. G03B 27/62
[52] U.S. Cl. .......................................... 355/75; 355/50
[58] Field of Search ....................... 355/49, 50, 51, 75, 355/76, 133, 11, 8

[56] References Cited

U.S. PATENT DOCUMENTS

| | | | |
|---|---|---|---|
| 2,959,095 | 11/1960 | Magnusson | 355/49 |
| 3,993,406 | 11/1976 | Zeuthen | 355/50 X |
| 3,994,582 | 11/1976 | Goshima et al. | 355/75 |
| 4,049,348 | 9/1977 | Cormier | 355/50 |
| 4,078,862 | 3/1978 | Kuwana | 355/75 X |
| 4,154,527 | 5/1979 | Schnall et al. | 355/75 |
| 4,157,222 | 6/1979 | Ishihara | 355/75 |

*Primary Examiner*—Richard A. Wintercorn
*Attorney, Agent, or Firm*—Toren, McGeady and Stanger

[57] ABSTRACT

A copying machine with an exposure carriage adapted for reciprocating movement along the top wall of the machine and to receive an object from which a copy is intended to be made wherein this exposure carriage comprises an angle-shaped rail member overlying one of the upper longitudinal edges of the machine and extending into the machine in engagement with reciprocating motive means within the machine, the carriage rail holding by a releasable clamping engagement a glass plate in a position overlying the top wall of the machine and adapted to support a copying object, as well as a hinge member in which is mounted an elastic pressure mat forming a cover for the glass plate. The pressure mat together with the hinge member may be pulled out of the carriage rail for providing an unimpeded access to the glass plate copying area, or may be locked in the carriage rail by e.g. a top mounted stop ledge.

10 Claims, 6 Drawing Figures

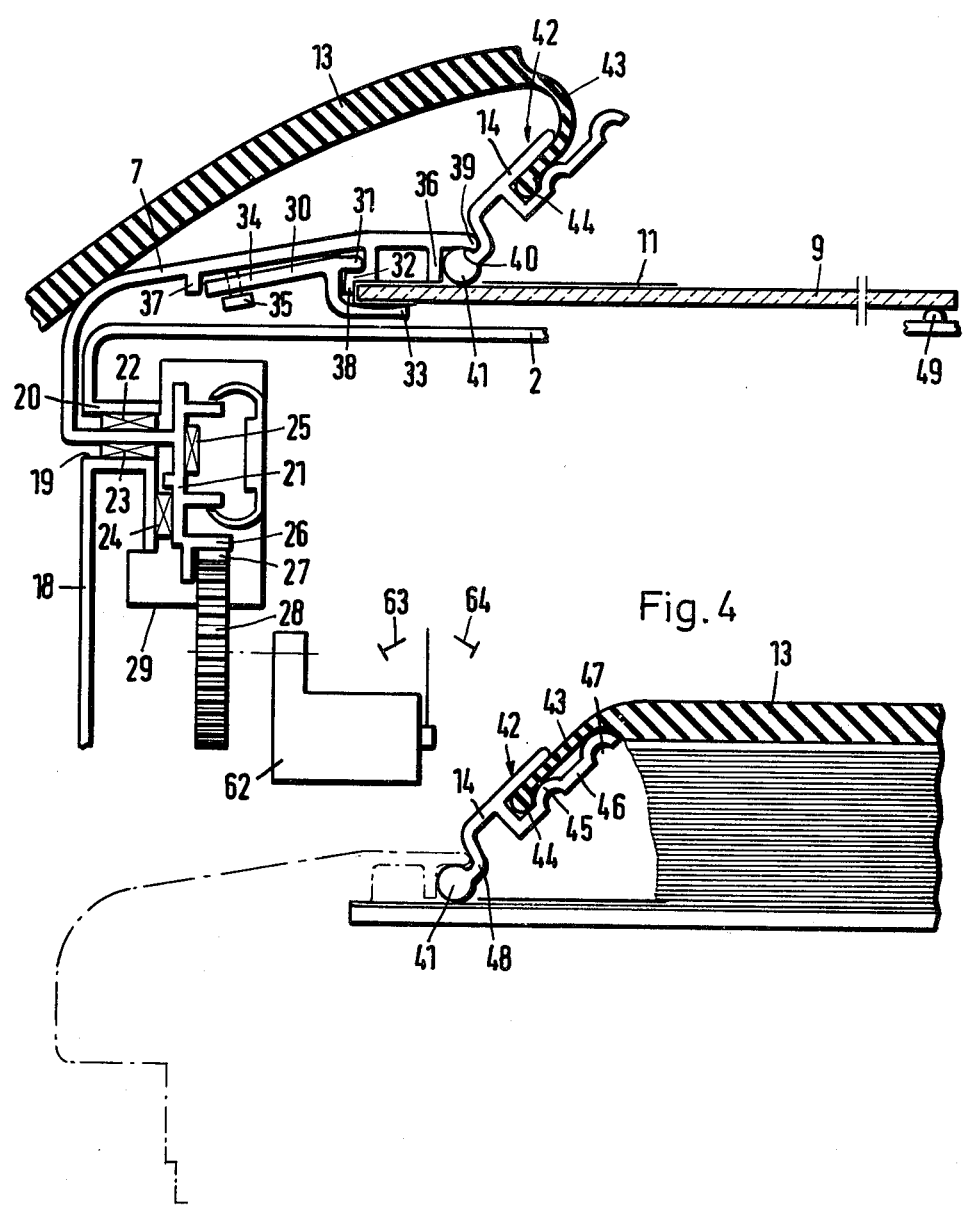

EXPOSURE CARRIAGE FOR A COPYING MACHINE

The present invention relates generally to copying machines and more particularly to an exposure carriage in a copying machine, the exposure carriage including a glass plate for receiving an original intended to be copied and a pressure mat pivotably articulated at the upper surface of the glass plate, the copying machine having at its top side an exposure window across which the glass plate is adapted to be reciprocated by motive means disposed within the machine. The invention also relates to a copying machine of this type which includes an exposure carriage.

A copying machine having an exposure carriage of this type is known e.g. by the U.S. Pat. No. 2,959,095. This known exposure carriage is arranged within a cover member that is adapted to be opened on one side. For opening this cover member, there is provided a lid so as to allow a reciprocating movement of the exposure carriage proper and for providing access for inserting an original. This heretofore known exposure carriage includes a glass plate within a frame which is guided for reciprocating movement along rails. These rails consist of rods on which are guided support extensions for the frame by means of holes. On top of the glass plate is mounted at the frame at one end by resilient hinges a pressure mat made of an elastic material, and the other end of the pressure mat may be secured by an elastic locking element.

It is likewise known to articulate a pressure mat on one side in thus providing a folding arrangement under which may be placed on original.

Both this heretofore known arrangement as well as the design known by the above cited U.S. patent have the drawback of a relatively complex constructional design with numerous parts and high assembly costs, and are furthermore restricted to the format of a copying area of the glass plate.

It is an object of the present invention to provide a novel and improved exposure carriage for a copying machine.

It is another object of the present invention to provide a copying machine having an improved exposure carriage.

It is still another object of the present invention to provide an exposure carriage and likewise a copying machine for such an exposure carriage having guide means of a simple design, being adapted to be readily assembled from a few parts, being on the whole less expensive and having the advantage of allowing copies also of larger-size originals that exceed the size of the copying area.

In accordance with the present invention, these objects are achieved by the characteristic that the exposure carriage comprises several members which are releasably assembled by clamping connections. This not only allows to assemble the exposure carriage from a few parts by unskilled personnel but to partly disassemble the carriage in providing a surface allowing to copy segments of large-size originals. Toward this end, the pressure mat is advantageously releasably arranged by means of a disengagable locking assembly.

In a preferred embodiment of the invention, the exposure carriage includes a carriage rail overlying the copying machine along a lateral longitudinal edge of the machine, and the carriage rail includes profiles at which the glass plate is clamped by means of a clamping profile member on the one hand, and a hinge profile with the pressure mat is pivotably retained by means of the clamped glass plate on the other hand. The clamping connections thereby define receiving apertures for the hinge profile which may be mounted after clamping the glass plate.

In a preferred modification the hinge profile includes a pivotably mounted marginal web of a substantially circular cross-section, and this web is adapted to be slidably inserted in longitudinal direction into a receiver bearing at the carriage rail. With this design, the pressure mat together with its mounting may be slidably inserted or withdrawn so that there may be provided a virtually continuous support surface for originals because of the shallow design of glass plate and carriage rail.

Very advantageously may be provided a recess in the carriage rail in the vicinity of the pivot mounting and adjacent an end of a copying area defined by the glass plate, and the locking assembly may include a stop ledge adapted to be inserted into this recess with a concurrent locking arrangement with a profiled portion of the marginal web of the hinge profile. With this design, the pressure mat may be readily locked in its mounted position and released by outside manipulation.

In this arrangement it is preferred that the stop ledge at least partly transversely overlaps the glass plate, and stop means or respectively snap engagement means are provided for releasably securing in position the inserted stop ledge. The stop ledge thereby provides an abutment edge for originals which facilitates operation, and on the other hand the stop ledge may also serve other purposes.

With particular advantage a groove-shaped profiled portion is arranged at the slidably inserted end of the pivotably mounted part of the hinge profile, and an extension of the stop ledge engages this groove-shaped profiled portion. This groove-shaped profiled portion may be formed by a milled away portion or a recess at the marginal web of the hinge profile. It is likewise possible to insert a cap screw centrally into the end surface of this marginal web so that the head of this cap screw is spaced from the end surface in thereby defining an engagement profile. It may be understood that the extension at the stop ledge may likewise be of a hook configuration for bilaterally engaging the peripheral profiled portion.

In a simple but advantageous embodiment will only be required a unilateral engagement when suitably are provided the stop means or snap engagement means for the stop ledge for releasably retaining this stop ledge in its operative position. In this design preferably a snap spring is arranged on the glass plate, the snap spring having an upwardly projecting portion under which is adapted to be slidably inserted a surface portion of the stop ledge, and mutually engaging profiles are provided intermediate the snap ring and the surface portion.

In a special embodiment the stop ledge includes in its upper surface receiving trays, and the surface portion is formed by the bottom wall of one of the receiving trays which is open on one side. The opening on one side may then be pushed onto the snap spring when moving the stop ledge into its locking operative position.

Suitably, the clamping profile defines at a leg underlying the lower surface of the pressure mat a stop edge for the delimitation of the copying area on the glass plate. Thus the clamping profile serves an additional purpose. Thereby is preferred that the leg includes adjacent its inner end an inner arched portion which is provided for retaining the pressure mat which is adapted to be slidably inserted along an edge portion including a bulge. With this design, the pressure mat may likewise be mounted by being slidably inserted into the clamping profile whereby positional fixation may be provided by a locking screw. Thereby, however, it is preferred that the downwardly concave arched portion is with respect to the copying window area of the glass plate at a spacing defining for a book of average thickness an engaging abutment for the edge of the book. With this design, this arched portion serves an additional purpose for aligning and guiding the text portion on the page of a book with respect to the edge of the copying area.

As will be apparent from the above, for copying segments of large-size originals the stop ledge is adapted to be lifted off, and the pressure mat together with the hinge profile may be slidably withdrawn without requiring special assembly manipulations.

It may also be pointed out that suitably the clamping profile member is inserted so as to be pivotable about an angle extension of the carriage rail and is adapted to be cocked by means of at least one cocking screw, in simultaneously clamping the glass plate.

With respect to heretofore known copying machines and the guide means it should be pointed out that the invention provides an advantageous copying machine wherein with respect to the exposure carriage a boss serving as a guide means for the glass plate at the side opposite the carriage rail is disposed on the top side of the machine, and the carriage rail is guided in roller bearings and mounts a tooth rack for a drive gear disposed within the copying machine.

In the following, the present invention will be described more in detail with reference to several preferred embodiments illustrated in the appended drawings wherein FIG. 1 is a perspective view of a copying machine with an exposure carriage according to the present invention;

FIG. 3 is a fragmentary sectional elevational view of part of the copying machine and of the exposure carriage for explaining the arrangement of the exposure carriage at the copying machine;

FIG. 4 is a schematical view similar to FIG. 3 for explaining the insertion of an original;

In all FIGURES of the drawings similar parts are identified by the same reference numerals respectively.

Figure 1:
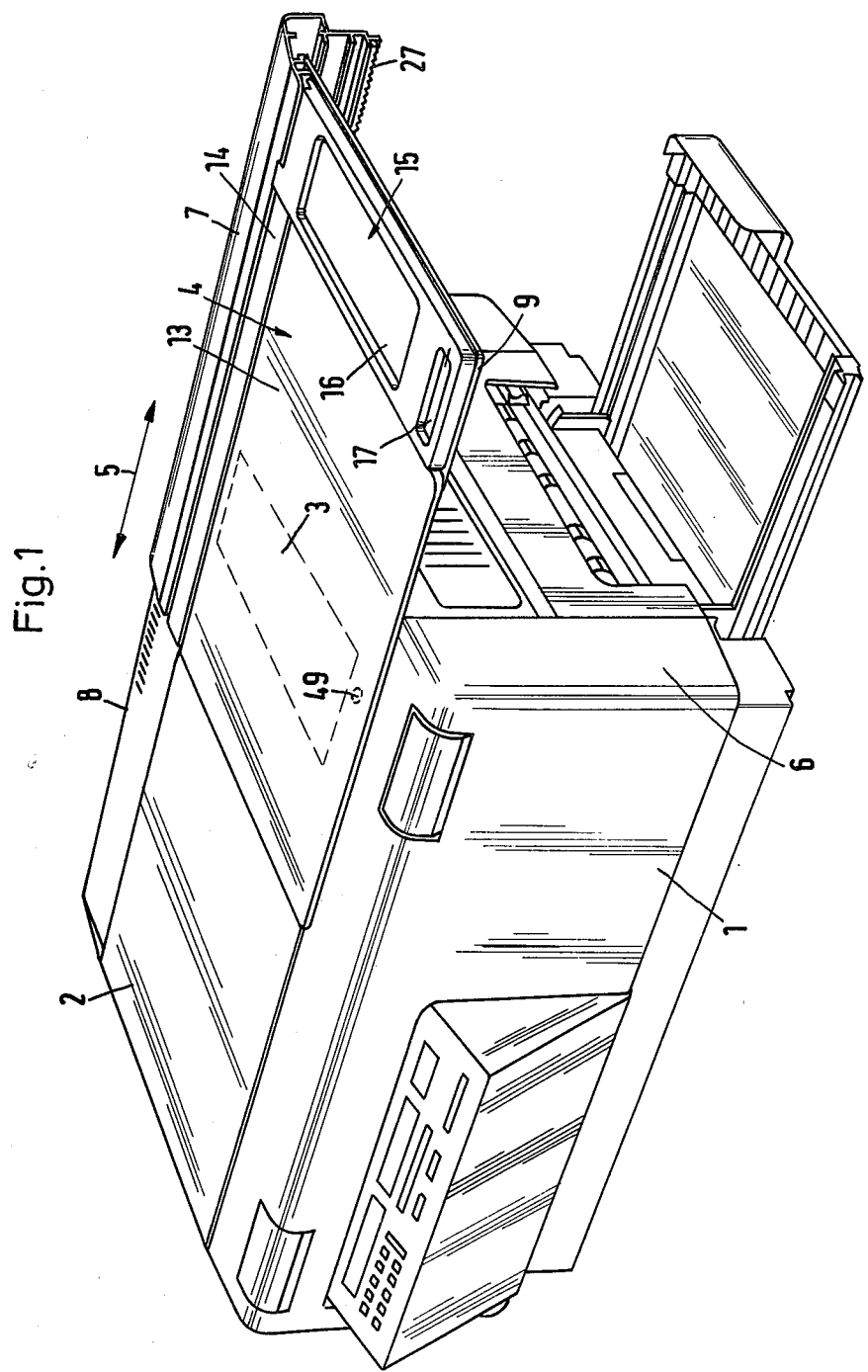

Referring to FIG. 1, there is shown a copying machine 1 having at its top side 2 a wall in which is disposed an exposure window 3. Above the exposure window is adapted to be reciprocated in the directions of the double headed arrow 5 an exposure carriage identified generally by the reference numeral 4. In the illustrated one end position the exposure carriage 4 extends partly beyond the adjacent machine face wall 6.

At one longitudinal side of the exposure carriage is arranged a carriage rail 7 which overlaps a longitudinal edge 8 of the copying machine 1 and extends through a slot into the housing of the copying machine, as will be explained below with reference to FIG. 3. The part of the carriage rail 7 which extends into the housing is mounted and guided within the housing and is operatively connected to motive devices.

A glass plate 9 is connected to the carriage rail 7. This glass plate (FIG. 2) may include opague cover portions 11, 12 along a longitudinal side portion adjacent the carriage rail 7 and at one end area, for delimiting a copying area 10. The assembly of glass plate 9 and carriage rail 7 mounts pivotably a pressure mat 13. This pressure mat is retained within a hinge profile 14.

As may also be seen in FIG. 1, the exposure carriage includes a stop ledge 15 which provides certain locking functions in the combination. The stop ledge is provided in its top surface with integral profiled receiving trays 16, 17 which are adapted to receive pencils, stylus or other stationery.

As may be seen particularly from FIG. 3, the carriage rail overlies partly the top side 2 of the machine 1 and partly a longitudinal side wall 18 in which is arranged a slot 19. An angle portion 20 of this carriage rail extends through this slot. At this angle portion is mounted another profile rail member 21. The angle portion 20 and the rail member 21 are respectively guided in roller bearing tracks 22, 23, 24, 25 which are mounted within the machine and serve to guide the whole exposure carriage. In a lower profile corner 26 of the rail member 21 is mounted a tooth rack 27. This tooth rack engages a gear 28 which is driven in a conventional manner by a reversible motive device. The drive motor assembly is indicated schematically at 62 in FIG. 3. A projecting rotary shaft may for example mount a lever which is pivotable to and fro in correspondence with the direction of movement of the carriage. As shown in FIG. 3 in a position rotated through 90°, the lever cooperates with abutment contacts 63, 64 which allow the reciprocating movement of the carriage in a conventional manner.

The exposure carriage 4 may be slidably inserted in longitudinal direction into the housing of the copying machine 1 because the guide chamber limitation indicated in FIG. 3 by the contour line 29 is open at its end side.

The glass plate 9 is clamped at the carriage rail 7 by means of a rail type clamping profile member 30. This clamping profile member includes a leg 31 which is mounted above an angle extension 32 at the lower surface of the carriage rail, and another, longer leg 33 that is spaced from the leg 31 and parallel thereto which leg 33 underlies the glass plate 9. Through the rail-like web 34 of the clamping profile member extends from below at least one cocking screw 35 which serves to cock the clamping profile member against the carriage rail 7 in thereby clamping the glass plate 9 at the lower surface of the angle extension 32 and at an additional angle web 36 by means of the leg 33. A profile web 37 serves for positional fixation of the clamping profile member 30. The angle extension 32 includes a bent portion which defines a corner 38 that engages an edge of the glass plate 9.

Referring to FIG. 3, the carriage rail extends beyond the profile web 36 toward the right in overlying the glass plate 9, and at the lower surface of this portion 39 is arranged a downwardly concave profiling in the form of a receiver bearing 40 extending in the longitudinal direction of the carriage rail 7. A marginal web 41 of a circular cross-section of the hinge profile 14 is inserted into this receiver bearing 40 and is retained therein by the glass plate 9. This marginal web is pivotably mounted within the receiver bearing 40.

Figure 6:
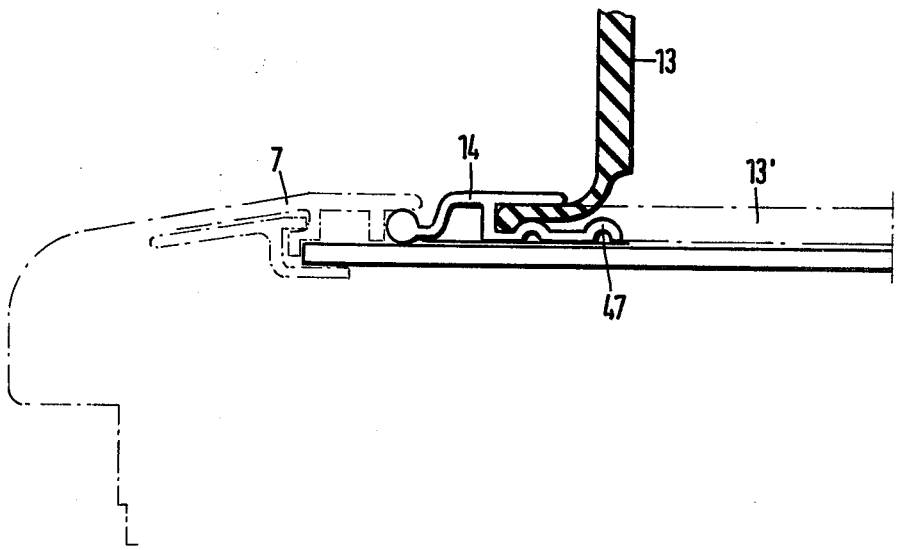
FIG. 6 is a view similar to FIG. 4 for explaining the function when inserting a sheet type original.

The hinge profile 14 has at its end facing away from the marginal web 41 a fork-shaped receptacle 42 for receiving a reduced thickness extension 43 of the pressure mat 13; this extension is provided at its free end with a bulge 44 by which the extension is retained within the fork-shaped receptacle behind a downwardly concave arched portion 45 of a leg 46 of the receptacle 42, the leg 46 underlying the pressure mat 13. This leg includes at its free end an additional arched portion 47. The leg 46 is disposed in the same plane as an extension 48 at the marginal web 41 so that in the basic position the upper profile wall of the hinge portion 14 extends in the same height as the carriage rail 7 (FIG. 6).

The carriage rail 7 which is of an angular cross-sectional design and the angle portion 20 extending through a slot in the longitudinal side wall 18 of the machine allow to arrange the guide and motive devices for the exposure carriage below the top side 2 of the machine so that there will result an extremely shallow design of the exposure carriage. With the described guide means it will be sufficient to provide merely a pimple shaped boss 49 made of a plastic material or any other suitable material of a low coefficient of friction for supporting the carriage or respectively the glass plate 9 at the other longitudinal edge on the machine top side.

As will be apparent from the above description of this embodiment, the pressure mat 13 with its hinge profile 14 may be slidably inserted in longitudinal direction into the receiver bearing 40. The mounting may be effected by friction forces. According to an advantageous embodiment there is provided a locking assembly by means of the stop ledge 15 which is accessible from the top and may be readily inserted or removed.

Figure 2:
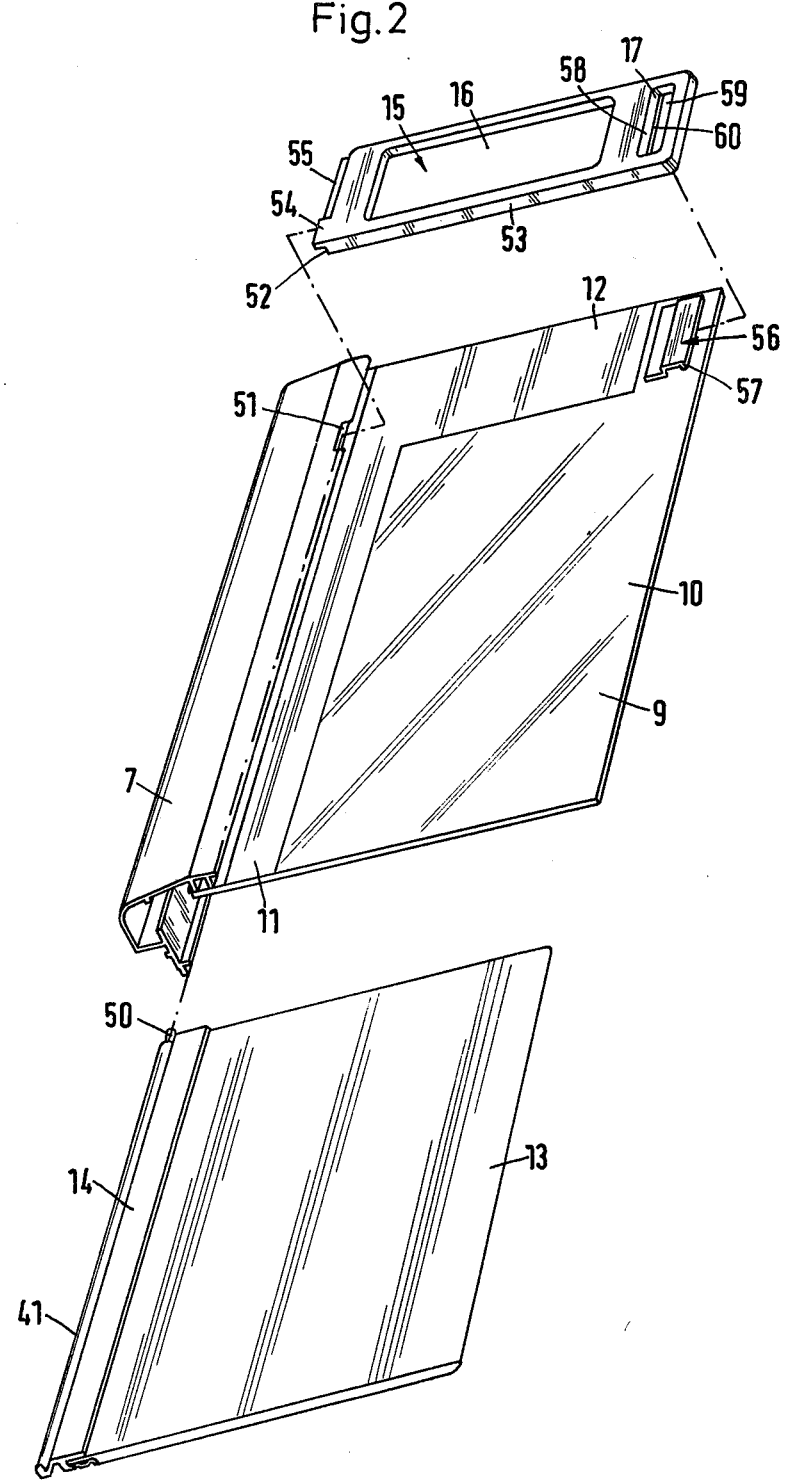
FIG. 2 is a perspective view of the disassembled exposure carriage.

From FIG. 2 will be apparent that the marginal web 41 includes at its slidably insertable end a circumferentially profiled portion 50 formed by a recess. This profiled portion may for example be formed by a cap screw. In the slidably inserted position of the pressure mat 13 this profiled portion is disposed at a lateral recess 51 of the carriage rail 7. In its mounted position a protruding and at least angular profile portion 52 of the stop ledge 15 engages by its side wall 53 facing the copying area 10 the recess 51 and simultaneously the profile portion 50. In this manner, the member with the pressure mat 13 will be positionally locked. The angular profile portion 52 is suitably arranged at an extension 54 being of substantially the same width as the recess 51. Additionally, the stop ledge 15 may include a web 55 which for positional fixation extends intermediate the carriage rail 7 and the glass plate 9.

For further positional fixation against lateral escape, a snap spring 56 is arranged on the glass plate 9. The snap spring includes an upwardly projecting leg and a bent resilient leg extending along the upper surface of the glass plate 9 and having preferably a downwardly facing profile 57. With this embodiment, the receiving tray 17 has at its edge 58 a wall opening so that when inserting the stop ledge 15 the bottom surface portion 59 of the tray 17 may be engaged underneath the resilient leg of the snap spring 56. The surface portion 59 has suitably a mating profile 60 with respect to the profile 57.

The way of insertion and removal is indicated by the dash-dotted line in FIG. 2.

Referring to FIG. 4, it will be apparent that the additional arched portion 47 at the hinge profile 14 provides a guidance of the pressure mat 13 even for rather thick copying objects.

Figure 5:
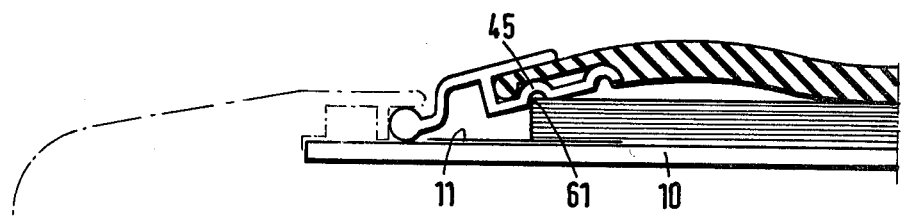
FIG. 5 is a view similar to FIG. 4 for explaining the insertion of a normal stack of originals.

As may be seen from FIG. 5, the inner arched portion 45 serves likewise for alignment or respectively guidance of the edge 61 of a book-type or stack-type original of average height so that the usual type area of this original will be held at the edge of the copying area 10, i.e. at the side of the cover portion 11.

In FIG. 6 is shown the pressure mat 13 of a shallow design on the top side of the machine whereby it may be seen that due to the different lengths of the legs of the receptacle 42 or a fork-shaped cross-section with a shorter upper leg the pressure mat may be lifted upwardly so as to expose the space adjacent the additional arched portion 47 arranged at the end. This allows to conveniently align an original at this edge.

The described copying machine has the advantage of a closed and flat top surface and of a shallow design of the carriage rail which is movable as a support of a large size drawing from which possibly a segment is intended to be copied. Therefore, this drawing need not be folded at the edges of the exposure carriage, and this the less so since likewise the guide means at the other side merely consist of the boss 49 which is always covered by the glass plate 9.

What is claimed is:

1. An exposure carriage for a copying machine with a housing having in its top side an exposure window, the exposure carriage including a carriage rail overlying an upper longitudinal side edge of said copying machine, a glass plate movable along the top side of the copying machine and being connected to said carriage rail, a pressure mat at the upper surface of said glass plate and motive means disposed within said copying machine and operatively connected to said carriage rail for reciprocating said carriage rail, the improvement comprising first clamping connecting means (30, 31, 33, 34, 35) for releasably connecting said carriage rail (7) to said glass plate (9), second connecting means being defined by the connection of said carriage rail (7) to said glass plate and serving to releasably receive a hinge profile, and third releasable connecting means intermediate said hinge profile and said pressure mat whereby said connecting means, parts of said exposure carriage, said carriage rail, said glass plate and said pressure mat are detachably assembled by clamping connections.

2. An exposure carriage as defined in claim 1 wherein said first clamping connecting means includes profile member (32, 33, 36, 38, 39) at said carriage rail and a clamping profile member (30) being guided at profile members (32, 37, 39) to releasably secure said glass plate, said second connecting means including a concave profile member at said carriage rail defining a receiver bearing opposite said glass plate (9) and a marginal web (41) of a substantially circular cross-section at said hinge profile, said marginal web being slidably insertable in longitudinal direction into said receiver bearing at said carriage rail (7), and said second connecting means including a profiled receptacle (42) of a fork-shaped cross-section in said hinge profile and a bulge (44) at the engaged edge of said pressure mat.

3. An exposure carriage as defined in claim 2 wherein is provided a locking assembly (50, 52) adapted to be lifted off for said second connecting means for securing said pressure mat in said receiver bearing.

4. An exposure carriage as defined in claim 3 wherein said locking assembly includes a stop ledge (15) and a recess (51) in a marginal web (41) of said hinge profile (14) at said receiver bearing (40), and an extension (52, 54) at said stop ledge, said extension when mounting said stop ledge (15) engaging said recess (51) and engaging said marginal web (41) of said hinge profile (14).

5. An exposure carriage as defined in claim 4 wherein a groove-shaped profiled portion (50) is arranged at the marginal web (41) of said hinge profile, said groove-shaped profiled portion being engagable by said extension (52) at said stop ledge (15), said stop ledge in its mounted position at least partly transversely overlapping said glass plate (9), and abutment and snap engagement means (56) on said glass plate (9) for engaging said stop ledge to releasably secure in position said mounted stop ledge.

6. An exposure carriage as defined in claim 5 wherein said abutment and snap engagement means include a snap spring (56) having an upwardly projecting leg and a bent resilient leg extending along said glass plate (9), said stop ledge (15) having in its upper surface integral profiled trays (16, 17), the bottom of one of said trays (17) defining a surface portion (59), said tray having on one side adjacent the bottom a wall opening, and said bent leg of said snap spring being adapted to be inserted through said wall opening to slidably overlie said surface portion (59).

7. An exposure carriage as defined in claim 1 wherein said hinge profile includes at its edge facing away from said marginal web a pair of bar-shaped legs defining a receptacle (42) of a fork-shaped cross-section of said hinge profile for an edge of said pressure mat (13), said hinge profile (14) defining at its leg (46) underlying the lower surface of said pressure mat (13) an abutment edge for a boundary (11) of said copying area on said glass plate (9), said leg (46) having adjacent its inner end an inner arched portion (45), an edge of said pressure mat engaging said hinge profile having a bulge (44) adapted to be slidably inserted between said legs and to the rear of said inner arched portion (45).

8. An exposure carriage as defined in claim 7 wherein said inner arched portion (45) defines in said leg an arched portion which is concave downwardly toward said glass plate (9) and is at a spacing from said marginal web (41) so that for a book type original of average thickness an edge of said original will be adapted to be inserted into said downwardly concave arched portion in thereby defining a guide for this original with respect to the copying area (10) of said glass plate (9).

9. An exposure carriage as defined in claim 1 wherein a profiled portion (32) at said carriage rail includes a corner extension (38) about which is pivotably inserted said clamping profile member (30) whereby one leg (31) of said clamping profile member engages behind said angle extension (38) and another leg (33) of said clamping profile member underlies said glass plate (9), and in a third rail-like web (34) of said clamping profile member extending at an angle to said first leg (31) is mounted a cocking screw (35) adapted to cock said clamping profile member in clamping said glass plate (9) at said carriage rail (7) whereby said angle extension (32) defines a corner (38) defining an abutment for said glass plate.

10. A copying machine having a top wall defining the top side of said machine and an exposure window disposed in said top side wall; an exposure carriage including a carriage rail (7) overlying the copying machine along an upper longitudinal side edge thereof, a glass plate being movable along the top side of said copying machine and being connected to said carriage rail, a pressure mat provided at the upper surface of said glass plate; and motive means within said copying machine in operative engagement with said carriage rail for reciprocating said carriage rail; and a locking assembly (50, 51) adapted to be lifted off, said locking assembly adapted to secure said pressure mat in a receiver bearing and including a stop ledge (15) with an extension which when mounting said stop ledge (15) engages said pressure mat and said receiver bearing; said stop ledge (15) being adapted to be lifted off and said pressure mat (13) being adapted to be withdrawn for providing copies of segments of large-scale originals; a pimple-shaped boss (49) defining guide means for the glass plate in an area of said top side (2) remote from said carriage rail; said carriage rail being of an angular design overlying a longitudinal edge (8) of said copying machine (1) and extending through a slot (19) in a longitudinal side wall (18) of said machine into said machine and being guided in roller bearings below said top side (2) and mounting a tooth rack adapted to engage a drive gear disposed within said copying machine.

* * * * *